United States Patent
Alatorre et al.

(10) Patent No.: US 8,930,667 B2
(45) Date of Patent: Jan. 6, 2015

(54) CONTROLLING THE PLACEMENT OF DATA IN A STORAGE SYSTEM

(75) Inventors: Gabriel Alatorre, San Jose, CA (US); Christian Bolik, Bremen (DE); Dietmar Noll, Mainz (DE); Laura Richardson, Manassas, VA (US); Aameek Singh, San Jose, CA (US); Sudhir V. R. Koka, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 13/612,196

(22) Filed: Sep. 12, 2012

(65) Prior Publication Data

US 2013/0151804 A1 Jun. 13, 2013

(30) Foreign Application Priority Data

Dec. 13, 2011 (EP) .................................. 11193300

(51) Int. Cl.
*G06F 12/00* (2006.01)
*G06F 12/02* (2006.01)
*G06F 17/30* (2006.01)

(52) U.S. Cl.
CPC .............. *G06F 12/02* (2013.01); *G06F 17/301* (2013.01)
USPC ........... 711/170; 711/114; 711/118; 711/129; 711/112; 711/162

(58) Field of Classification Search
CPC ...... G06F 12/02; G06F 3/0631; G06F 17/301
See application file for complete search history.

(56) References Cited

U.S. PATENT DOCUMENTS

| | | | |
|---|---|---|---|
| 7,415,490 B2 | 8/2008 | Takeda et al. | |
| 7,533,230 B2 | 5/2009 | Glover et al. | |
| 7,844,701 B2 | 11/2010 | Ramany et al. | |
| 7,895,398 B2 | 2/2011 | Shet et al. | |
| 2003/0225801 A1* | 12/2003 | Devarakonda et al. | 707/205 |
| 2006/0080365 A1* | 4/2006 | Glover et al. | 707/200 |
| 2007/0203937 A1* | 8/2007 | Prahlad et al. | 707/102 |
| 2010/0082765 A1 | 4/2010 | Murase | |
| 2010/0205390 A1 | 8/2010 | Arakawa | |
| 2010/0274827 A1 | 10/2010 | Hix et al. | |
| 2011/0010514 A1 | 1/2011 | Benhase et al. | |
| 2013/0185256 A1 | 7/2013 | Alatorre et al. | |

OTHER PUBLICATIONS

Alatorre et al., "Controlling the Placement of Data in a Storage System," U.S. Appl. No. 13/787,283, filed Mar. 6, 2013, 35 pages.
Hitachi Data Systems Corporation, "Hitachi NAS Platform, Powered by BlueArc®: System Software v8", Feb. 2011, 2 pages.

* cited by examiner

*Primary Examiner* — Aimee Li
*Assistant Examiner* — Arvind Talukdar
(74) *Attorney, Agent, or Firm* — Yee & Associates, P.C.; Jeffrey S. LaBaw

(57) ABSTRACT

A method, computer readable storage medium and computer system for controlling the allocation of data to one of a plurality of storage units of a storage system, the method comprising: accessing a source storage unit comprising the data; gathering file system level (FS-level) metadata from the source storage unit; analyzing the gathered FS-level metadata for determining if the data should be moved to one of the other storage units, said other storage unit acting as a destination storage unit; and in case the data should be moved, displaying an indication of the destination storage unit and/or automatically moving the data to the determined destination storage unit.

13 Claims, 4 Drawing Sheets

CONTROLLING THE PLACEMENT OF DATA IN A STORAGE SYSTEM

FIELD OF THE INVENTION

The invention relates to the field of storage management, and more particularly to a method for controlling the allocation of data in one of a plurality of storage units of a storage system.

BACKGROUND

Data management systems are used to automatically control the storage of data by automating the placement of data according to various criteria. Data placement in such systems comprises a decision on which one of a plurality of storage units the data should be stored for minimizing the costs without causing the quality of data provisioning services based on said data to decline significantly. It must be ensured that the data can be reliably and quickly provided to one or more clients, wherein the speed and the reliability of the data transfer and of other service criteria may be specified in service level objectives (SLOs). Several existing data management systems as disclosed, for example, in U.S. Pat. No. 7,949,847 B2 use virtualization technology to give, in a process known as 'thin provisioning', the appearance of more physical resources than are actually available for reducing the costs.

Information Lifecycle Management (ILM) systems apply 'rules' or 'policies' to automatically manage data, associate it with metadata of various kind and provide it to different users or user groups.

Hierarchical storage management (HSM) systems automatically move data, in particular files, between high-cost storage devices typically having short access times and low-cost storage media typically having longer access times to provide for an optimal compromise between data provision speed and cost.

One drawback of today's HSM implementations is that they often rely on a single type of file system as they require support in the file system for hiding from the user the actual physical location of the stored data. Not every piece of data are, however, organized as an individual file system node, and different storage devices may comprise file systems of different types (ext2, ext3, FAT32, NTFS or the like) which may be incompatible with each other.

Data management systems being based on tiered storage (as provided e.g. by IBM's EasyTier storage system) classify the available disc drives into two or more kinds of storage devices in dependence on attributes such as price, access times, storage capacity and function (e.g. different RAID levels or replication). Storage devices of similar type may be assigned to a common storage tier. Thus, data which is only rarely accessed may be stored in a storage tier consisting of cheap storage devices with slow access time while heavily used data may be stored in another storage tier comprising more expensive hard drives.

One major deficiency in prior art data management systems which are based on tiered storage is that for deciding whether to migrate a volume's data from a storage volume in one storage pool to another volume of another storage pool (or, analogously, for deciding if one or more physical storage volumes of another pool should be assigned to a particular logical volume) in order to optimize disk usage with regards to price/performance, said systems are often not able to correctly determine if the data of a particular storage unit is of relevance for the user and/or operator of the data management system. The information used as input for said decision is often insufficient for determining the real relevance and future usage frequency of a particular piece of data. Thus, information gathered by prior art systems is often unsuited for determining the optimum destination storage unit for storing data in a given use case scenario. For example, data causing very high performance load (such as video stream data) may in fact be very unimportant for a given industrial control workflow and allocating such kind of data to highly efficient, expensive storage devices may actually be counterproductive.

SUMMARY OF THE INVENTION

It is an objective of embodiments of the invention to provide for an improved method, computer readable storage medium and computer system for controlling the allocation of data in one of a plurality of storage units of a storage system. Said objective is solved by the features of the independent claims. Preferred embodiments are given in the dependent claims.

If not explicitly stated otherwise, embodiments disclosed herein can be freely combined with each other. As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

A 'storage system' as used herein encompasses any kind of monolithic or distributed computer system comprising one or more storage units and comprising program logic for automatically or semi-automatically controlling the storing of data in one or more of said storage units.

The term 'data' as used herein encompasses any kind of computer-interpretable data, in particular files, file directories and/or tablespaces of relational databases. Said files may be of any format, e.g. XML format, text files, audio files, video files, image files, BLOBS or any other standard or customized file type.

A 'storage unit' as used herein encompasses any physical or logical storage volume as well as parts or combinations thereof which can be individually controlled by the logic of the storage system. The control may relate to the question to which storage unit a read or write access should be performed and/or to the question to which of said storage units a piece of data should be allocated. A storage volume may, for example, be a physical or logical storage volume which may be formatted by a file system and may be used as single accessible storage area within said file system. Depending on the embodiment, a storage volume may be a physical storage volume provided by one single storage medium or may be a logical storage volume, e.g. a VDisk in the case of IBM SAN Volume Controller, comprising a consecutive series of logical 'storage blocks' or 'blocks' which are mapped to a corresponding series of physical storage blocks.

According to some embodiments, at least some of the storage units of the storage system are logical storage volumes, wherein the logical storage blocks of each of said logical storage volumes are mapped onto physical storage blocks of one or more physical storage volumes (or 'physical storage media') subsumed under said logical storage volume. Any combination of one or more computer readable storage media may be utilized for providing a logical storage volume.

According to embodiments, at least some of the storage units managed by the storage system are so called 'extents'.

An 'extent' is a physical hard drive partition on a physical storage volume. In the case of the IBM SAN Volume Controller system, a storage pool is a collection of MDisks, wherein each MDisk may be divided into extents of equal size. According to some embodiments, at least some of the storage units are storage pools.

A 'graphic user interface' (GUI) as used herein is a graphical manmachine interface to be displayed on a display device, e.g. an LCD or touch screen monitor.

The term 'file system' as used herein is a means of organizing data storage in a storage unit. File systems are used on storage units to maintain and manage the location of data within the storage blocks of said storage unit. Some file systems provide mechanisms for automatically assigning metadata to files and other pieces of data organized by means of said file system.

The term 'FS-level metadata' as used herein encompasses any data which is assigned by the file system of one or more storage units to any file or other piece of data stored in said storage units and which is descriptive of a property of said stored data.

The term 'block-level metadata' as used herein encompasses any data which can be derived from a logical storage block of a logical storage volume or a physical storage block of a physical storage volume or an extent of said physical storage volume. Block-level metadata does not depend on the presence and type of any file system but rather depends on the underlying hardware or other low-level storage characteristics, e.g. storage characteristics derived from one or more storage blocks. According to preferred embodiments, the block-level metadata comprise one or more attribute values respectively being indicative of the extent of usage of a storage volume. Such attributes may comprise, for example, the occupied and/or free storage space on a storage volume, the number of input and/or output operations (I/O operations) per time, the amount of data written to and/or read from the storage volume, a response time in respect to an I/O request or access times and the like.

The term 'storage pool' as used herein is a collection of physical storage volumes sharing one or more criteria such as their respective hardware-based performance capabilities. The physical storage volumes of a pool may be combined for providing one or more logical storage volumes. Each of the logical storage volumes may be formatted according to a file system. Depending on the embodiment, the storage pools of a storage system may be part of the computer system which mounts the file systems of the logical volumes or may be part of an external dedicated storage system, wherein said external storage system is accessible by the computer system mounting the file systems. According to embodiments, in the case of the IBM SAN Volume Controller, a storage pool is a collection of MDisks. Each MDisk may be divided into extents.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In one aspect, the invention relates to a computer implemented method for controlling the allocation of data to one of a plurality of storage units of a storage system. The storage units are logical storage volumes, physical storage volumes, storage pools or extents or any mixture thereof. The method comprises: accessing a source storage unit, the source storage unit being one of the plurality of storage units. The source storage unit comprises the data and is formatted according to a file system type; gathering FS-level metadata from the source storage unit, the FS-level metadata comprising one or more attributes of files and/or of tablespaces stored in said source storage unit; analyzing the gathered FS-level metadata for determining if the data of the source storage unit shall be moved to one of the other storage units, said other storage unit acting as a destination storage unit; and in case the data should be moved, displaying an indication of the destination storage unit via a graphical user interface and/or automatically moving the data from the source storage unit to the destination storage unit.

Said features may be advantageous as it was observed that executing a decision based on attributes at the block-level of the storage units alone was not a good indicator of the relevance of a particular piece of data for the operator of the storage management system. Using meta data collected at the file-system level (FS-level metadata), which may comprise also performance-independent information such as file type information, as input for deciding if and where to move a particular set of data was observed to be a better indicator of the actual relevance of said data than block-level meta data alone. In a further advantageous aspect, the source storage unit and the destination storage unit may respectively use different types of storage media, such as solid-state disks (SSD) media or serial ATA (SATA) disks or a mixture thereof. As the analysis of metadata is executed on the file system level, and not on the storage block level, the data used for deciding where to allocate (i.e., store) the data is based on a higher level of abstraction, thereby allowing to abstract from particularities of the storage blocks of different storage media types. Thus, embodiments of the invention may allow determining, as a result of the analysis, with high accuracy whether the current source storage unit is suited for storing said data in terms of hardware cost and/or performance or if said data should rather be moved to another storage unit having different price and/or I/O performance characteristics.

In several state of the art systems, the determination of block-level performance characteristics is not possible at all. To the contrary, embodiments of the invention allow to automatically determine if a particular set of data should be placed on an expensive but fast storage unit or on a slow low-cost storage unit even in storage management systems in which a determination of block-level performance characteristics is not possible at all.

According to embodiments, the method further comprises gathering block-level metadata for each of the plurality of storage units, each gathered block-level metadata comprising one or more attributes of storage blocks of said storage unit; using the gathered block-level metadata in addition to the gathered FS-level metadata in the analysis for determining if the data shall be moved; and determining the destination storage unit by taking the gathered block-level metadata and the gathered FS-level metadata as input. Said features may be advantageous, because making use of FS-level metadata in addition to block-level metadata may allow a more accurate determination if the data should be moved from the source storage unit to another storage unit referred herein as 'destination storage unit'. Block-level metadata, as opposed to FS-level metadata, is independent from the file system type of a particular storage unit. Thus, even in case the source storage unit should be unformatted or in case the data is not organized and contained in a file of a file system, block-level metadata is available for automatically determining if and to which storage volume the data should be moved. Thus, said embodiments may optimize the placement of volumes by taking into consideration file system independent (block-level) metadata, which is always available, in addition to FS-level metadata. It has been observed that in several use case scenarios, a combined analysis of FS-level metadata and block-level metadata yields the highest accuracy when determining if and whereto the data should be moved.

According to preferred embodiments, the block-level metadata is gathered for physical storage volumes. In case the block level metadata is gathered for a storage pool consisting of a plurality of physical storage volumes, according to embodiments an average value may be calculated from the block-level metadata of all storage volumes of said storage pool for providing the block-level metadata of said storage pool. According to some embodiments wherein at least some of the storage units are logical storage volumes whose storage may be mapped to a physical storage. For example, logical storage blocks of a logical storage volume may be mapped to physical storage blocks of one or more different physical storage volumes. The block level metadata are gathered for all said physical storage volumes and used for calculating averaged block-level metadata for said logical volume. In case at least some of the storage units are extents, the gathering of the block-level metadata may comprise gathering said data for the physical blocks of the extents.

According to embodiments, the source storage unit is a first logical storage volume and the destination storage unit is a second logic storage volume, the first logical storage volumes being provided by one or more first physical storage volumes, the second logical storage volume being provided by one or more second physical storage volumes. The first and second physical storage volumes may be part of the same one or of different storage pools. By copying the data of all storage blocks of the first physical storage volumes to the second physical storage volumes, a copy of the data of the source storage unit is stored to the destination storage unit. After the copying, the source logical storage volume may be deleted or backed up, or serve as a backup. The source and destination storage units may be displayed or otherwise indicated to the users of the moved data and/or the operator of the storage system as independent, distinct data areas.

According to embodiments, moving the data from the source storage unit to the destination storage unit comprises the following steps: the source storage volume is a logical storage volume being based on a logical-to-physical mapping of storage blocks to one or more first physical storage volumes or extents thereof. The destination storage unit is at least a physical storage volume or extent thereof belonging to a destination storage pool (which may comprise more appropriate, e.g., faster, physical storage volumes). Upon having determined that the data of said logical source storage volume should be moved, the data is moved from storage blocks of the first physical storage volumes to the physical storage blocks of second physical storage volumes. While moving the data from the first to the second physical storage volume, the logical-to-physical mapping is amended in a way that the logical storage blocks of the source logical volume are re-mapped to physical storage blocks of the second physical storage volume. Thereby, the logical storage volume being the source storage unit is removed from the first storage pool (as it may be no longer mapped to storage blocks of the first storage volumes) and added to the second storage pool (as a consequence of the remapping). Thus, the migration of the data may have not affected the 'logical' structure of the logical storage volume being the source storage unit at all. The data movement may be executed completely transparent to the user.

According to some of said embodiments, the source and destination storage units may not be displayed or otherwise indicated to the users of the moved data and/or the operator of the storage system as independent, distinct data areas, but rather as one single logical storage volume. The process of data migration may be fully transparent to the user, such that the user does not even recognize the data migration at all.

According to embodiments, the FS-level metadata and/or the block-level metadata is gathered selectively for the accessed data or for the totality of data stored to the source storage unit comprising the accessed data (potentially among other data). According to preferred embodiments, the data moved from the source data volume to the destination data volume consists of all the data stored to the source storage unit. In a further advantageous aspect, the amount of labor needed for managing the data stored in the storage system is reduced.

According to embodiments the gathering of the block-level metadata for each of the plurality of storage units comprises: in case said storage unit is a physical storage volume or an extent thereof, the physical storage volume being part of a storage pool whose physical storage volumes share the same block-level metadata, the block-level metadata is gathered for the storage pool and used as the block-level metadata of said storage unit. Thus, the block-level data gathered for a particular storage unit may be gathered directly from said storage unit or from any higherordered organization of storage, e.g. from a storage pool comprising said storage unit, which can also act as a source of block-level metadata being indicative of block-level performance characteristics of said storage unit.

According to further embodiments, the one or more attributes of the block-level metadata are the one or more attributes of the block-level metadata are selected, in any combination, from a group comprising: an input rate and/or output rate of a storage block of the first storage unit; an input density of a write operation and/or output density of a read operation on a storage block; a response time of said storage block in response to a read and/or write request; a length of time for completing an input- and/or output operation on said storage block; an amount of data having been read from and/or written to a storage block during a predefined period of time; a number of read and/or write operations having been executed on a storage block during a predefined period of time; and a latency time for responding to a read and/or write request.

According to embodiments, the method further comprises the steps of gathering FS-level metadata for each of the storage units of the storage system; and, for each of the storage units of the storage system, analyzing the FS-level metadata gathered for said storage system for automatically determining the source storage unit. According to other embodiments, the method further comprises the steps of gathering FS-level metadata for each of the storage units of the storage system; and, for each of the storage units of the storage system, analyzing the FS-level metadata and the block-level metadata gathered for said storage system for automatically determining the source storage unit. Said features may be advantageous as they provide for a fully automated method for operating a storage system and for dynamically identifying and allocating relevant data on appropriate storage devices.

According to embodiments, the one or more gathered attributes of the FS-level metadata are selected from the group comprising a frequency of file access; a last file access time; a file modification time; a file creation time; a RTO requirements based on file type; a RPO requirements based on file type; a file size; a file type; a percentage of files assigned to one user relative to all files stored in a storage unit; a percentage of files assigned to one user group relative to all files stored in a storage unit; an average size of all files stored in a storage unit; and a path of the file or sub-parts thereof. The recovery point objectives (RPO) and the recovery time objective (RTO) are two specific parameters that are closely related with recovery. The RTO parameter is indicative of the time of non-availability of a particular file (maximum allowable outage). The RTO is commonly used for indicating a maximum allowed failover or backup time while replicating data to a backup volume. The RPO is indicative of the maximum amount of data loss considered as acceptable for a particular volume. The RTO and/or RPO attributes of the files may therefore be indicative of whether an RTO or RPO requirement was met by the files of a particular storage unit.

According to some embodiments, the gathering of FS-level metadata and/or the gathering of the block-level metadata and the evaluation whether the data should be moved to the destination storage unit is executed on a regular basis automatically. Said analysis may comprise the determination of the destination storage unit. In case it is determined that the data should be moved to the determined destination storage unit, the data may be moved fully automatically. Thus, embodiments of the invention may provide for a storage system which is operable to dynamically determine, given at least current FS-level metadata and optionally also block-level metadata, whether data of a source storage unit should be moved to a destination storage unit. Thus, a highly flexible, dynamically and autonomously acting storage system may be provided.

According to embodiments, one or more of the above attributes of the block-level metadata are monitored and used in any combination for measuring the load of any one of the storage units, while one or more of the above attributes of the FS-level metadata are monitored and used in any combination for measuring the relevance of the data of any one of the storage units. Thus, it may be automatically determined whether a particular set of data or the totality of data being currently stored on the first storage unit can and should be moved to any of the other storage units. For example, in case it was determined as a result of the analysis that one piece of data should be moved from the source storage unit to one of the other storage units, it is determined whether a candidate destination storage unit comprises enough free space and is not, according to its block-level metadata, already overloaded.

According to further embodiments, the method further comprises a step of loading one or more rules from a rules repository, each rule comprising one or more conditions. The analysis comprises evaluating the conditions of the loaded one or more rules against one or more of the attributes of the FS-level metadata and/or against one or more attributes of the block-level metadata of each of the other storage units for determining the destination storage unit. The term 'rule' as used herein refers to a computer-interpretable instruction with two parts: an if-clause and a then-clause, whereby the then-clause is only executed in case the if-clause returns the Boolean value 'true'.

Said features may be advantageous, because using rules instead of, for example, various machine learning algorithms, allows an operator of the storage system to flexibly adapt the rules being responsible for the determination of the destination storage unit in accordance with the requirements of a particular company, user group, application context and the like. For example, a rule may comprise one or more conditions relating to one or more of the gathered block-level metadata attribute values and/or relating to one or more attribute values being contained in the gathered FS-level metadata. In case all conditions of such a currently evaluated rule are fulfilled, its then-clause may be executed comprising instructions triggering the automated movement of the data to the destination storage unit and/or triggering the display of an indication of said determined destination storage unit.

According to embodiments, the conditions of at least one of the rules comprise block-level metadata conditions and FS-level metadata conditions. Both the block-level metadata conditions and FS-level metadata conditions are evaluated. Said features may be advantageous, because it has been observed that by combining the information contained in block-level as well as FS-level metadata, a particularly adequate determination of a destination storage unit suiting the requirements of a given application context in respect to the cost and speed of data provisioning may be enabled.

According to embodiments, the step of executing the analysis comprises: executing a scan process for counting the number of files stored in the source storage unit and having been determined to have one of a plurality of file types, the scan process returning, for each of the file types, a total number of files of said file type and being stored to the source storage unit; calculating, for one or more of the file types, a ratio of the counted files of said file type and the total number of files of the source storage unit; and evaluating one or more of the conditions comprising a file type-specific threshold value on the calculated one or more ratios. In case at least one of the calculated ratios exceeds one of the threshold values of the file type said ratio was calculated for, the data of the source storage unit is automatically moved from the source storage unit to the determined destination storage unit or a user is prompted via the graphical interface for approval to said automated movement of the data. Said features may allow to automatically move data predominantly comprising relevant file types (e.g. text files) to a fast storage unit while the data content of storage units predominantly comprising non-relevant file types (e.g. video files and audio files) can be automatically moved to a less-expensive storage unit.

According to embodiments, the scan process is executed for counting the number of files stored in the source storage unit and having a text file type such as, for example, .txt, .doc or .docx files. In many application contexts, text files are considered as particularly relevant for a business context as the text files may comprise information required by one or more employees or may be the product of a collaborative work of multiple employees. Thus, text files are considered as being of high relevance in many application scenarios. The scan process returns a total number of files having a text file type and being stored on the source storage unit. Then, a ratio of the determined number of text files and the total number of files of that source storage unit is calculated. Then, one or more rules are evaluated against the block-level metadata being indicative of the load of the other storage units and against the ratio having been calculated from the FS-level metadata 'text file type'. Said rules may comprise conditions and program logic allowing determining the ratio of text file types in a volume by evaluating the file name extensions of the files of a volume. In case it is determined that the calculated ratio of files in the source volume exceeds a threshold value of e.g. 40%, said other storage unit may be determined to be the destination storage unit.

According to embodiments, a scanning step is executed for determining a ratio of audio files or video files within the source storage unit. The determined ratio is compared by one of the rules against a predefined threshold ratio value. If the determined ratio exceeds that threshold ratio value, the data of the source storage unit is migrated to a lowercost destination storage unit.

According to further embodiments, one of the rules automatically moves the data of the source storage unit to a destination storage unit in case upon evaluation of said rule it is determined that a first threshold related to a FS-level metadata attribute (e.g. last access time for a certain ratio of files) as well as a block-level metadata threshold value (e.g. I/O density was measured to be smaller than 0.3) is met. Using rules for specifying and/or modifying conditions if and when the data should be automatically moved may be advantageous as existing storage systems such as the IBM Tivoli Storage Productivity Center® storage system already come with some means for creating and modifying rules. According to further embodiments, one of the rules may move data to a storage tier providing a higher quality of service in case the files on the source storage units are getting accessed, modified or created more frequently over a period of time. Some further rules may automatically move the data of the source storage unit in case "the average age of the files stored therein "exceeds a threshold time periods, e.g., 1 year", in case "the number of files created during a period of time exceeds a threshold number, e.g. 1000" and/or in case "the total size of files modified exceeds a threshold size, e.g. 100 Mb".

According to embodiments, the data of the source volume is moved on the block level, i.e. based on moving the data content of one or more blocks per transaction, to the determined destination storage unit. Typically, all blocks of a volume are moved per transaction. Executing a block-wise data migration upon having determined the destination storage unit based on FS-level metadata may be particularly advantageous in case of moving a plurality of files being of small file size as typically the case in web applications, because the block-wise movement of data can be executed faster in said scenarios. Thus, the benefits of both worlds may be combined: the speed of data migration is increased by moving data on the block level while the accuracy of determining relevant or irrelevant data which needs to be moved is increased by using FS-level metadata. Said features allow for an acceleration of data migration compared to today's HSM implementations executing the data migration in a file-based manner.

According to embodiments, the method further comprises displaying to a user a graphical user interface (GUI), the GUI comprising means for creating and/or modifying the rules; and modifying one or more of the conditions of at least one of the rules for modifying the analysis step for determining the destination storage unit. Said features may be advantageous as they may allow a user to verify the automatically determined destination storage unit and may also provide a user with feedback information whether the currently applied rules are operable to determine the destination storage unit accurately.

According to embodiments, in case it was determined that one of the calculated ratios for a first one of the plurality of file types exceeds one of the threshold values, the method comprises triggering the automated movement of the data from the source storage unit to the destination storage unit, the destination storage unit being a compression-enabled storage unit. Said compression-enabled storage unit may be part of a compression-enabled storage pool. According to some embodiments, said first file type is a 'text file' type.

Said features may be particularly advantageous for storing data which consume—in uncompressed state—a lot of storage space in a more storage-space conserving manner. According to embodiments, the evaluation comprises determining whether the ratio of text files, which usually can be compressed very well, exceeds a first threshold value and comprises a step of determining whether the average age of said text files or the average age of any files of said storage unit exceeds an age-related threshold value. Depending on the embodiment, the age of the file can be calculated by evaluating FS-level attributes such as last access time of a file, creation time of a file, or the like. In case the ratio of text files exceeds said first threshold value and in case in addition the calculated average age exceeds the age-related threshold value, the data of the source storage unit is moved to a destination storage unit being an archive storage unit. An archive storage unit is any kind of volume which is based mainly or completely on comparatively slow (and usually cheap) storage media, which may support compression, and is thus ideally suited for archiving purposes. The plurality of storage units may comprise a sequential storage unit such as a tape storage for archiving purposes.

According to further embodiments, the evaluation of the conditions of the loaded one or more rules comprises predicting a load of input and/or output operations to be executed on the source storage unit; and automatically moving the data of the source storage unit to the determined destination storage unit in case the predicted load exceeds a maximum load threshold value. This may allow preventing a violation of SLAs.

According to some embodiments, the rules may trigger or execute the movement of the data in dependence on their respective conditions immediately or in dependence on a prescheduled time and date. Said features may be advantageous as they allow an operator of the storage management system to specify rules which are particularly adapted for specialized events and use case scenarios and/or for specifying routine back up work. For example, said features may allow loading highly relevant text data automatically to a high-quality destination storage unit in the morning hours to provide employees of a company with text files which can be quickly read from and written to said storage unit. Said features may also provide for an automated data archiving system appropriate to archive non-relevant data automatically.

According to embodiments, the method further comprises determining, upon executing the analysis, a list of one or more candidate destination storage units, and determining one of the candidate destination storage units to be the destination storage unit. According to some embodiments, said determined candidate destination storage unit is the one whose gathered block-level metadata is indicative of a lower input and/or output load than the block-level metadata of any of the other candidate destination storage units.

According to other embodiments, said determined candidate destination storage unit is determined by executing the following steps: predicting a first expected load of each of said candidate destination storage units by taking a storage unit performance model as input; predicting a second expected load of each of the candidate destination storage units by using the FS-level metadata of the source storage unit or by using said FS-level metadata in combination with the block-level metadata of said source storage unit as input, the second expected load being indicative of an expected I/O load of one of the candidate destination storage units after having moved all the data from the source storage unit to said candidate destination storage unit; evaluating the first and the second expected load and eliminating any candidate destination storage units from the list if it is predicted to violate against one or more minimum performance conditions in case the data of the source storage unit would be moved to said candidate destination storage unit. Depending on the embodiment, the evaluation may comprise a superposition of the first expected load according to the model and the second expected load determined in dependence on the FS-level metadata to provide for a total expected load which may be compared with a set of performance quality conditions. Thus, it can be determined if the data, if moved to a particular candidate destination volume, will be provided e.g. in agreement with some SLAs. A performance model may be a specification of the average load of a particular storage unit or storage unit having been measured over a period of time, e.g. one hour, one day or one week. Said model may be a user specific or user-role specific model. The model may reflect the typical load of a particular storage unit in an application context at a given moment in time. According to some embodiments, the storage system comprises at least a first and a second storage tier, the source storage unit belonging to the source storage tier, the determined destination storage unit belonging to the second storage tier. The first and second storage tiers provide their respective storage units in accordance with different service level objectives. According to embodiments, each storage tier may comprise one or more storage pools sharing one or more characteristics. These characteristics may relate to I/O performance of the physical storage units in the storage pool, their reliability, their cost or any other criteria. Said features may be advantageous as they may allow to dynamically move data from a first storage tier offering a lower quality of service to a second storage tier offering a higher quality of service.

According to embodiments, moving the data from the source storage unit to the destination storage unit is based on a re-mapping of physical storage block addresses and logical storage block addresses. The data is stored before the movement is started—on logical blocks of the source storage unit which are mapped to a first set of physical storage blocks. By re-mapping that logical storage blocks to a second set of physical storage blocks of physical storage media constituting the destination storage unit, and by copying the data from the first to the second set of physical storage blocks, the data can be moved transparently (not visible for the user) from the source to the destination storage unit.

In a further aspect, the invention relates to a computer-readable, tangible storage medium comprising computer-interpretable instructions which when executed by a processor cause the processor to execute the computer implemented method according to anyone of the above embodiments.

In a further aspect, the invention relates to a computer system comprising:
a storage system. The storage system comprises a plurality of storage units. The storage units are logical storage volumes, physical storage volumes, storage pools or extents or any mixture thereof.
a monitor and control module being adapted for:
accessing a source storage unit, the source storage unit being one of the plurality of storage units, the source storage unit comprising the data and being formatted according to a file system type;
gathering FS-level metadata from the source storage unit, the FS-level metadata comprising one or more attributes of files and/or of tablespaces stored in said source storage unit;
analyzing the gathered FS-level metadata for determining if the data of the source storage unit shall be moved to one of the other storage units, said other storage unit acting as a destination storage unit;
and a graphical user interface;
The monitoring and control module is further adapted for triggering, in case the data should be moved, the displaying of an indication of the destination storage unit via a graphical user interface and/or is adapted for automatically moving the data from the source storage unit to the destination storage unit.

BRIEF DESCRIPTION OF THE DRAWINGS

In the following, preferred embodiments of the invention will be described in greater detail by way of example only making reference to the drawings in which.

DETAILED DESCRIPTION

Figure 1:
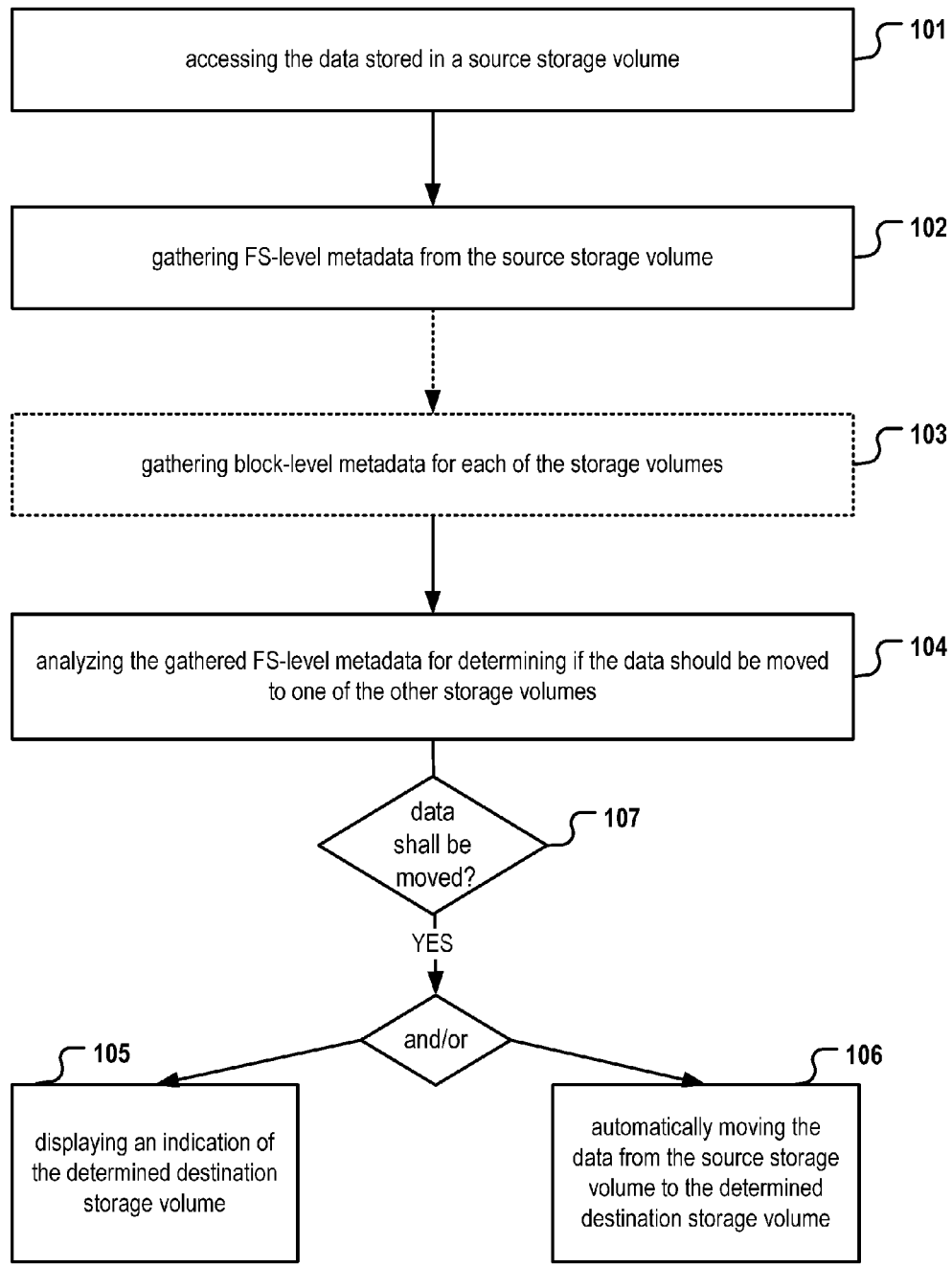
FIG. 1 shows a flowchart of an embodiment of the invention.

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In the following, like numbered elements in these figures are either similar elements or perform an equivalent function.

In a first accessing step 101, the monitoring and control module 204 accesses FS-level metadata of data being stored in a source storage unit of the storage system 207. In a gathering step 102, the monitoring and control module 204 gathers the FS-level metadata from said source storage unit. The gathering step may be executed on a regular basis by a scanner module 207. According to some embodiments, the scanner module may also gather block-level metadata from the storage units when executing a scan. In an analyzing step 104, an analyzer module 208 of the monitoring and control module 204 analyzes the gathered FS-level metadata for determining if the source storage unit should be migrated to one of the other storage units acting as a destination storage unit. Then, in case a decision step 107 determines that the data should be moved, an indication of the destination storage unit is displayed via a GUI 205 to a user 210 in a displaying step 105. In addition or alternatively, in a moving step 106, the data of the source storage unit or parts thereof are automatically moved from the source storage unit to the destination storage unit.

Figure 2:
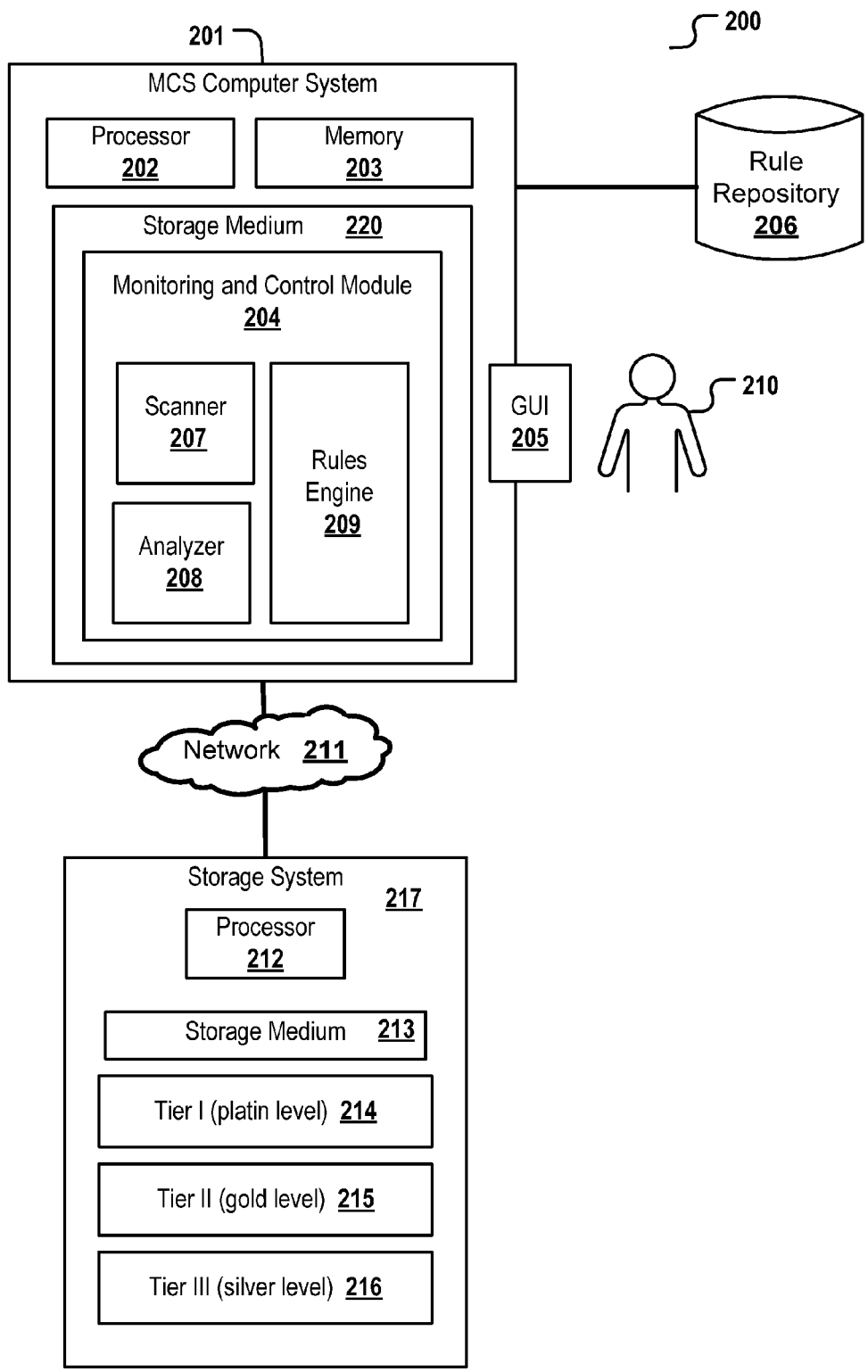
FIG. 2 shows a block diagram of a computer system comprising a storage system.
Figure 3:
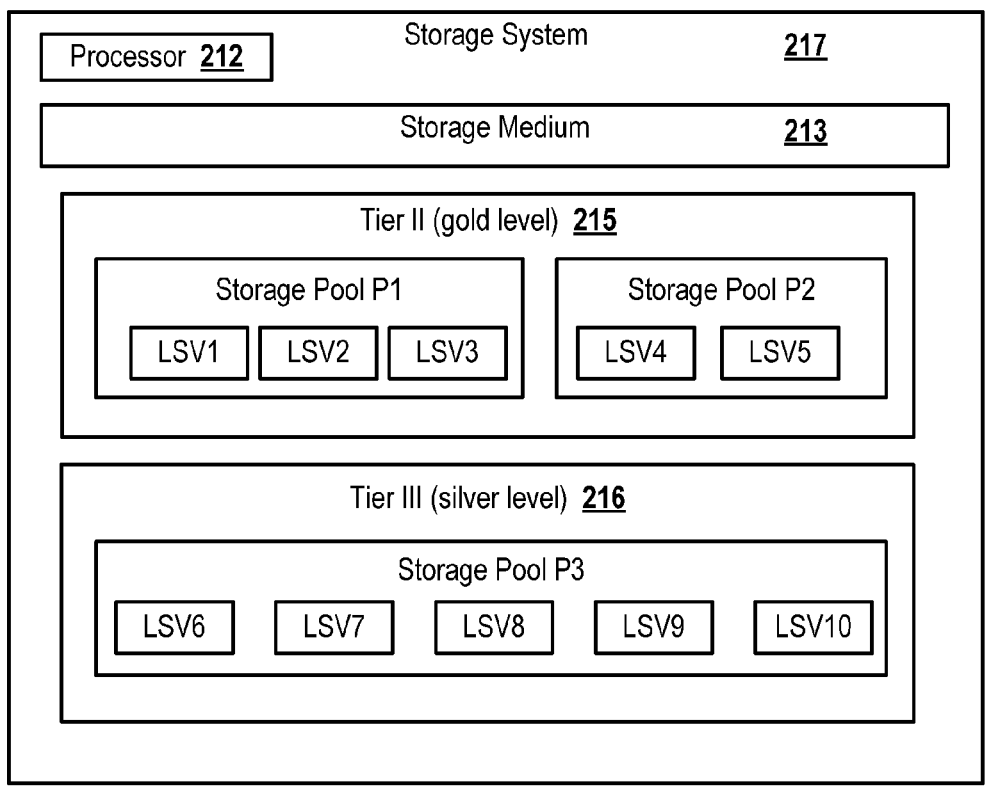
FIG. 3 shows components of the storage system.
Figure 4:
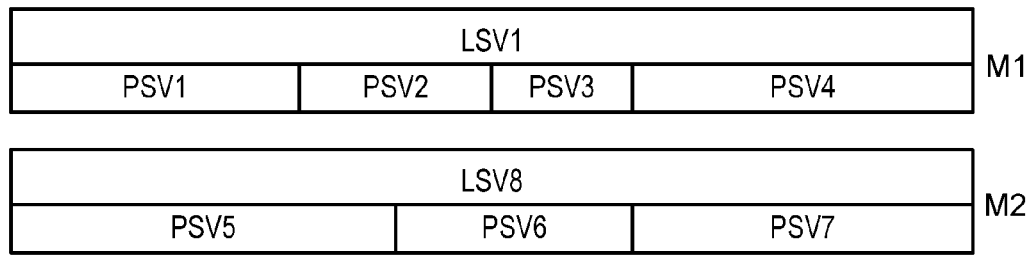
FIG. 4 illustrates the mapping of physical storage volumes to logical storage volumes.

In the following, embodiments of the invention will be described by reference to the elements of FIGS. 2, 3 and 4. FIG. 2 displays a distributed computer system 200 comprising an MCS computer system 201 which is operatively coupled via a network 211 to a storage system 217. The MCS computer system comprises a processor 202 and a main memory 203. It further comprises a computer readable, non-transitory storage medium 220 which comprises instructions specifying a monitoring and control module 204 which is adapted for controlling the configuration of the storage systems for controlling the allocation of data within one or more storage units of said storage system. The monitoring and control module comprises a rules engine 209 which is operable to read one or more rules stored to a rule repository 206. The rules repository may be a file repository, a relational database system or the like and is operatively coupled to the MCS computer system 201. The MCS computer system further comprises a graphical user interface 205 for displaying an indication of an automatically determined destination storage unit belonging to one of the storage tiers 214-216 of the storage system. The graphical user interface may also be used by user 210 for creating and/or modifying the rules stored in the rules repository 206. The storage system 217 comprises a storage medium 213 comprising computer executable instructions for managing the allocation of data to storage units of various storage tiers 214-216. Said instructions may be executed by processor 212 and are based on a configuration modifiable by the monitoring and control module. The storage units of each of the storage tiers 214-216 may belong to one or more storage pools as depicted in FIG. 3. A first tier 215, referred herein as 'gold level tier', may provide the storage and data contained therein in a very fast and reliable manner based on a set of high-quality service level objectives. It may comprise a first storage pool P1 and a second storage pool P2. Each storage pool may comprise one or more logical storage units (storage pool LP1: LSV1-LSV3; storage pool LP2: LSV4-LSV5; storage pool LP3: LSV6-LSV10). Each of the storage units LSV1-LSV10 may be physical storage media. According to other embodiments as depicted, e.g., in FIG. 4, said storage units may be logical storage units whose storage blocks are mapped to storage blocks of one or more physical storage units PSV1-PSV7. According to embodiments, the storage units of a particular storage pool are based on a single type of physical storage units such as, for example, SSD disks, SATA disks or on a mix of volumes of different types.

Figure 5:
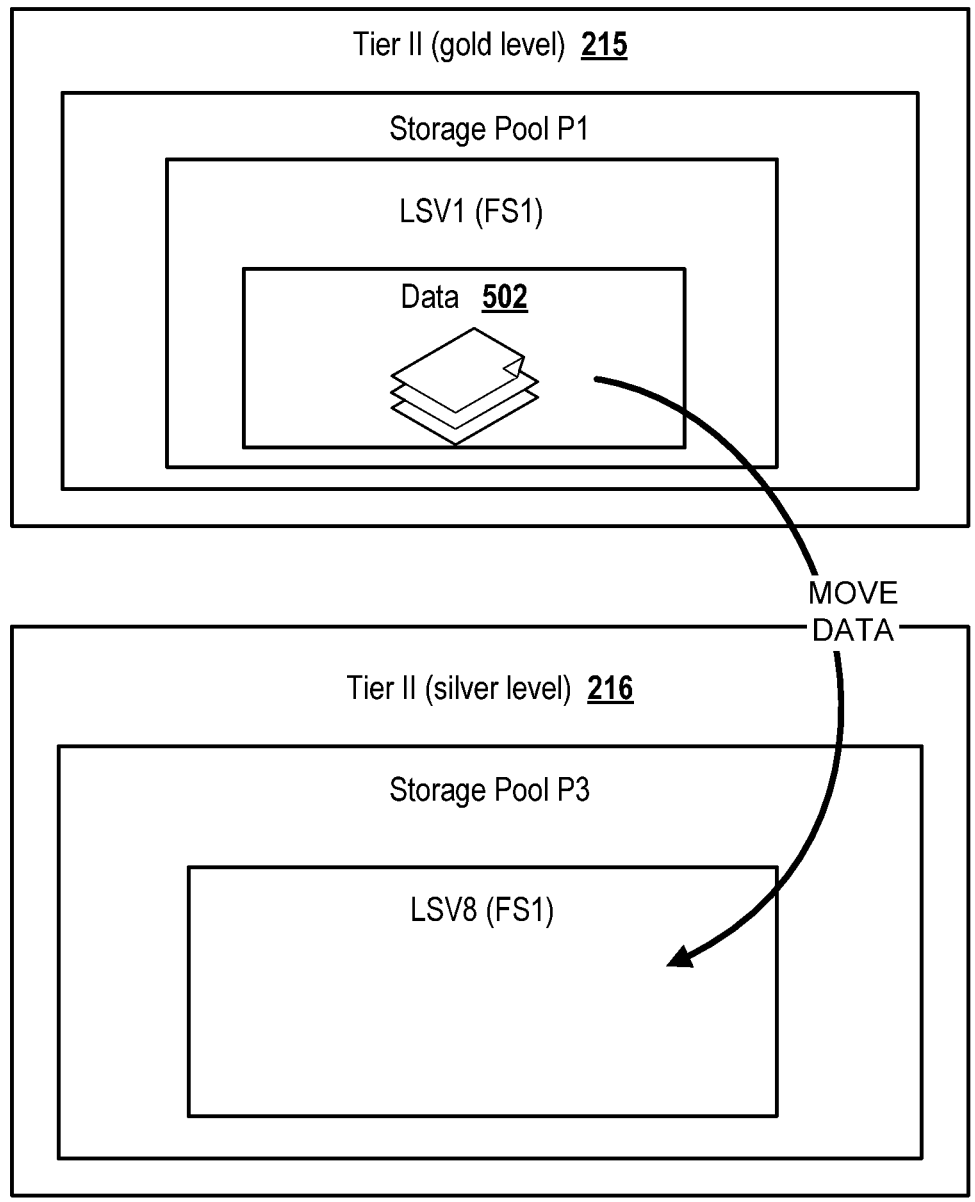
FIG. 5 shows the movement of data from a first to a second storage unit.

FIG. 5 shows the process of moving data 502 from a source storage unit LSV1 having file system FS1 to another storage volume LSV8. The data 502 comprises one or more files. The source storage unit and the destination storage units belong to different storage pools P1, P3 respectively belonging to different storage tiers tier II 215 and tier III 216.

The invention claimed is:

1. A computer system, comprising:
a storage system comprising a plurality of storage units, the storage units being logical storage volumes, physical storage volumes, storage pools or extents or any mixture thereof;
a monitor and control module being adapted for:
    accessing a source storage unit, the source storage unit being one of the plurality of storage units, the source storage unit comprising the data and being formatted according to a file system type;
    gathering file system level (FS-level) metadata from the source storage unit, the FS-level metadata comprising one or more attributes of files and/or of tablespaces stored in said source storage unit;
    analyzing the gathered FS-level metadata for determining if the data of the source storage unit should be moved to one of the other storage units, said other storage unit acting as a destination storage unit;
and a graphical user interface;
wherein the monitoring and control module is further adapted for
moving, in case the data should be moved, the data from the source storage unit to the destination storage unit; and
loading one or more rules from a rules repository, each rule comprising one or more conditions;
wherein the analysis comprises evaluating the conditions of the loaded one or more rules against one or more of the attributes of the FS-level metadata and/or against one or more attributes of the block-level metadata of each of the other storage units for determining the destination storage unit, wherein executing the analysis comprises:
executing a scan process for counting the number of files stored in the source storage unit and having been determined to have one of a plurality of file types, the scan process returning, for each of the file types, a total number of files having said file type and being stored to the source storage unit;
calculating, for one or more of the file types, a ratio of the counted files of said file type and the total number of files of the source storage unit; and
evaluating one or more of the conditions comprising a file type-specific threshold value on the calculated one or more ratios;
wherein in case at least one of the calculated ratios exceeds one of the threshold values of the file type said ratio was calculated for, the data of the source storage unit is automatically moved from the source storage unit to the determined destination storage unit or a user is prompted via the graphical interface for approval to said automated movement of the data.

2. The computer system according to claim 1, further comprising:
displaying to a user a graphical user interface, the graphical user interface comprising means for creating and/or modifying the rules; and
modifying one or more of the conditions of at least one of the rules for modifying the analysis step for determining the destination storage unit.

3. A computer system, comprising:
a storage system comprising a plurality of storage units, the storage units being logical storage volumes, physical storage volumes, storage pools or extents or any mixture thereof;
a monitor and control module being adapted for:
    accessing a source storage unit, the source storage unit being one of the plurality of storage units, the source storage unit comprising the data and being formatted according to a file system type;

gathering file system level (FS-level) metadata from the source storage unit, the FS-level metadata comprising one or more attributes of files and/or of tablespaces stored in said source storage unit;

analyzing the gathered FS-level metadata for determining if the data of the source storage unit should be moved to one of the other storage units, said other storage unit acting as a destination storage unit;

and a graphical user interface;

wherein the monitoring and control module is further adapted for moving, in case the data should be moved, the data from the source storage unit to the destination storage unit; and loading one or more rules from a rules repository, each rule comprising one or more conditions;

wherein the analysis comprises evaluating the conditions of the loaded one or more rules against one or more of the attributes of the FS-level metadata and/or against one or more attributes of the block-level metadata of each of the other storage units for determining the destination storage unit, and wherein in case it was determined that one of the calculated ratios for a first one of the plurality of file types exceeds one of the threshold values, triggering an automated movement of the data from the source storage unit to the destination storage unit, the destination storage unit being a compression-enabled storage unit.

4. The computer system according to claim 3, wherein the evaluation of the conditions of the loaded one or more rules comprises:

predicting a load of input and/or output operations to be executed on the source storage unit; and automatically moving the data of the source storage unit to the determined destination storage unit in case the predicted load exceeds a maximum load threshold value.

5. A computer system, comprising:

a storage system comprising a plurality of storage units, the storage units being logical storage volumes, physical storage volumes, storage pools or extents or any mixture thereof;

a monitor and control module being adapted for:

accessing a source storage unit, the source storage unit being one of the plurality of storage units, the source storage unit comprising the data and being formatted according to a file system type;

gathering file system level (FS-level) metadata from the source storage unit, the FS-level metadata comprising one or more attributes of files and/or of tablespaces stored in said source storage unit;

analyzing the gathered FS-level metadata for determining if the data of the source storage unit should be moved to one of the other storage units, said other storage unit acting as a destination storage unit;

gathering block-level metadata for each of the plurality of storage units, each gathered block-level metadata comprising one or more attributes of storage blocks of said storage unit;

using the gathered block-level metadata in addition to the gathered FS-level metadata in the analysis for determining if the data should be moved; and determining the destination storage unit by taking the gathered block-level metadata and the gathered FS-level metadata as input and a graphical user interface;

wherein the monitoring and control module is further adapted for moving, in case the data should be moved, the data from the source storage unit to the destination storage unit;

determining, upon executing the analysis, a list of one or more candidate destination storage units; and determining one of the candidate destination storage units to be the destination storage unit, wherein said determined candidate destination storage unit is determined by executing the following steps:

predicting a first expected load of each of said candidate destination storage units by taking a storage unit performance model as input;

predicting a second expected load of each of the candidate destination storage units by using the FS-level metadata of the source storage unit or by using said FS-level metadata in combination with the block-level metadata of said source storage unit as input, the second expected load being indicative of an expected I/O load of one of the candidate destination storage units after having moved all the data from the source storage unit to said candidate destination storage unit; and evaluating the first and the second expected load and eliminating any candidate destination storage units from the list if it is predicted to violate against one or more minimum performance conditions in case the data of the source storage unit would be moved to said candidate destination storage unit.

6. The computer system according to claim 1, wherein the storage system comprises at least a first and a second storage tier, the source storage unit belonging to the source storage tier, the determined destination storage unit belonging to the second storage tier, the first and second storage tier providing their storage units in accordance with different service level objectives.

7. A method implemented by a computer for controlling the allocation of data to one of a plurality of storage units of a storage system, the storage units being logical storage volumes, physical storage volumes, storage pools or extents or any mixture thereof, the method comprising:

accessing a source storage unit, the source storage unit being one of the plurality of storage units, the source storage unit comprising the data and being formatted according to a file system type;

gathering file system level (FS-level) metadata from the source storage unit, the FS-level metadata comprising one or more attributes of files and/or of tablespaces stored in said source storage unit;

analyzing at least the gathered FS-level metadata for determining if the data of the source storage unit should be moved to one of the other storage units, said other storage unit acting as a destination storage unit; and in case the data should be moved, moving the data from the source storage unit to the destination storage unit;

loading one or more rules from a rules repository, each rule comprising one or more conditions;

wherein the analysis comprises evaluating the conditions of the loaded one or more rules against one or more of the attributes of the FS-level metadata and/or against one or more attributes of the block-level metadata of each of the other storage units for determining the destination storage unit, wherein executing the analysis comprises:

executing a scan process for counting the number of files stored in the source storage unit and having been determined to have one of a plurality of file types, the scan process returning, for each of the file types, a total number of files having said file type and being stored to the source storage unit;

calculating, for one or more of the file types, a ratio of the counted files of said file type and the total number of files of the source storage unit; and evaluating one or more of the conditions comprising a file type-specific threshold value on the calculated one or more ratios;

wherein in case at least one of the calculated ratios exceeds one of the threshold values of the file type said ratio was calculated for, the data of the source storage unit is automatically moved from the source storage unit to the determined destination storage unit or a user is prompted via the graphical interface for approval to said automated movement of the data.

8. The method according to claim 7, further comprising:

displaying to a user a graphical user interface, the graphical user interface comprising means for creating and/or modifying the rules; and modifying one or more of the conditions of at least one of the rules for modifying the analysis step for determining the destination storage unit.

9. A method implemented by a computer for controlling the allocation of data to one of a plurality of storage units of a storage system, the storage units being logical storage volumes, physical storage volumes, storage pools or extents or any mixture thereof, the method comprising:

accessing a source storage unit, the source storage unit being one of the plurality of storage units, the source storage unit comprising the data and being formatted according to a file system type;

gathering file system level (FS-level) metadata from the source storage unit, the FS-level metadata comprising one or more attributes of files and/or of tablespaces stored in said source storage unit;

analyzing at least the gathered FS-level metadata for determining if the data of the source storage unit should be moved to one of the other storage units, said other storage unit acting as a destination storage unit; and in case the data should be moved, moving the data from the source storage unit to the destination storage unit;

loading one or more rules from a rules repository, each rule comprising one or more conditions;

wherein the analysis comprises evaluating the conditions of the loaded one or more rules against one or more of the attributes of the FS-level metadata and/or against one or more attributes of the block-level metadata of each of the other storage units for determining the destination storage unit;

in case it was determined that one of the calculated ratios for a first one of the plurality of file types exceeds one of the threshold values, triggering an automated movement of the data from the source storage unit to the destination storage unit, the destination storage unit being a compression-enabled storage unit.

10. The method according to claim 9, wherein the evaluation of the conditions of the loaded one or more rules comprises:

predicting a load of input and/or output operations to be executed on the source storage unit; and automatically moving the data of the source storage unit to the determined destination storage unit in case the predicted load exceeds a maximum load threshold value.

11. A method implemented by a computer for controlling the allocation of data to one of a plurality of storage units of a storage system, the storage units being logical storage volumes, physical storage volumes, storage pools or extents or any mixture thereof, the method comprising:

accessing a source storage unit, the source storage unit being one of the plurality of storage units, the source storage unit comprising the data and being formatted according to a file system type;

gathering file system level (FS-level) metadata from the source storage unit, the FS-level metadata comprising one or more attributes of files and/or of tablespaces stored in said source storage unit;

analyzing at least the gathered FS-level metadata for determining if the data of the source storage unit should be moved to one of the other storage units, said other storage unit acting as a destination storage unit;

in case the data should be moved, moving the data from the source storage unit to the destination storage unit;

gathering block-level metadata for each of the plurality of storage units, each gathered block-level metadata comprising one or more attributes of storage blocks of said storage unit;

using the gathered block-level metadata in addition to the gathered FS-level metadata in the analysis for determining if the data should be moved;

determining the destination storage unit by taking the gathered block-level metadata and the gathered FS-level metadata as input;

determining, upon executing the analysis, a list of one or more candidate destination storage units, and determining one of the candidate destination storage units to be the destination storage unit, wherein said determined candidate destination storage unit is determined by executing the following steps:

predicting a first expected load of each of said candidate destination storage units by taking a storage unit performance model as input;

predicting a second expected load of each of the candidate destination storage units by using the FS-level metadata of the source storage unit or by using said FS-level metadata in combination with the block-level metadata of said source storage unit as input, the second expected load being indicative of an expected I/O load of one of the candidate destination storage units after having moved all the data from the source storage unit to said candidate destination storage unit; and evaluating the first and the second expected load and eliminating any candidate destination storage units from the list if it is predicted to violate against one or more minimum performance conditions in case the data of the source storage unit would be moved to said candidate destination storage unit.

12. The method according to claim 7, wherein the storage system comprises at least a first and a second storage tier, the source storage unit belonging to the source storage tier, the determined destination storage unit belonging to the second storage tier, the first and second storage tier providing their storage units in accordance with different service level objectives.

13. A computer-readable, non-transitory storage medium comprising computer-interpretable instructions which when executed by a processor cause the processor to execute the computer implemented method according to claim 7.

* * * * *